United States Patent [19]

Dedolph

[11] 4,034,508
[45] July 12, 1977

[54] POLYMERIZED SOIL WITH GROWING PLANT AND METHOD OF MAKING AND PACKAGE THEREFOR AND HANGER AND PLAQUE INCORPORATING THE SAME

[75] Inventor: Richard R. Dedolph, Naperville, Ill.

[73] Assignee: Gravi-Mechanics Co., Naperville, Ill.

[21] Appl. No.: 603,753

[22] Filed: Aug. 11, 1975

[51] Int. Cl.$^2$ .......................................... A01G 9/02
[52] U.S. Cl. ..................................... 47/84; 47/67; 47/71; 47/74; 47/83; 71/64 A; 260/2.5 R
[58] Field of Search ............................... 264/90–91, 264/101; 47/1.2, 34.11, DIG. 2, DIG. 3, 34–35, 37–38.1, 58, 34.13, 41, 41.12; 260/2.5; 71/64

[56] References Cited

U.S. PATENT DOCUMENTS

| | | | |
|---|---|---|---|
| 2,994,424 | 8/1961 | Selby et al. | 47/41 UX |
| 3,063,196 | 11/1962 | Pauer | 47/34.12 |
| 3,310,912 | 3/1967 | Melander | 47/41.12 |
| 3,320,697 | 5/1967 | Larsen | 47/34.11 |
| 3,362,106 | 1/1968 | Goldring | 47/38 X |
| 3,373,009 | 3/1968 | Pruitt et al. | 47/37 UX |
| 3,608,238 | 9/1971 | Reuter | 47/1.2 |
| 3,739,522 | 6/1973 | Greenbaum | 47/34.13 |
| 3,812,619 | 5/1974 | Wood et al. | 47/37 X |
| 3,834,072 | 9/1974 | Rack | 47/37 |
| 3,854,242 | 12/1974 | Gladstein | 47/35 |
| 3,878,279 | 3/1975 | Sorrells et al. | 264/101 X |

FOREIGN PATENT DOCUMENTS

| | | | |
|---|---|---|---|
| 922,106 | 3/1973 | Canada | 47/1.2 |
| 1,414,012 | 9/1965 | France | 47/34.11 |
| 65,119 | 10/1892 | Germany | 47/35 |
| 1,949,473 | 4/1971 | Germany | 47/1.2 |
| 978,985 | 1/1965 | United Kingdom | 47/DIG. 2 |

Primary Examiner—Robert E. Bagwill
Attorney, Agent, or Firm—Prangley, Dithmar, Vogel, Sandler & Stotland

[57] ABSTRACT

A polymerized soil plug with a growing plant molded therein comprising a body of spongy open-celled hydrophilic polymer, a growing plant having the roots thereof in the body of spongy polymer and having the stalk thereof extending outwardly from one surface, and a quantity of particles of soil mix distributed throughout the body of spongy polymer, a quantity of synthetic organic plastic resin being reacted in situ to form the body spongy open-celled hydrophilic polymer binding the particles of soil mix therein and into a plug and binding the roots in the plug, the soil mix comprising from about 20% to about 80% by dry weight of the soil plug, the roots being distributed substantially uniformly throughout the adjacent portions of the plug and the stalk being intimately surrounded by the plug; the method of making such a soil plug is also disclosed as well as a package for retail sale of the soil plugs with growing plants therein; also disclosed are hangers and a plaque for receiving the soil plugs.

63 Claims, 22 Drawing Figures U.S. Patent  July 12, 1977  Sheet 3 of 3  4,034,508

POLYMERIZED SOIL WITH GROWING PLANT AND METHOD OF MAKING AND PACKAGE THEREFOR AND HANGER AND PLAQUE INCORPORATING THE SAME

BACKGROUND OF THE INVENTION

The present invention relates generally to improvements in growing and merchandising plants, and specifically to the provision of improved soil plugs for growing plants, where the plug and plant are to be sold at retail and thereafter used by the purchaser in decorative hangers, plaques and the like.

Standard practice heretofore has been to provide plants for sale either in a bare root condition or with a soil block around the roots. Many plants cannot be readily handled in the bare root condition and require an intact soil block about the roots. In such case flats or other containers of soil blocks with plants growing therein are provided, such as in the case of bedding plants, seeded foliage plants, foliage plant cuttings, certain types of nursery stock, and many field transplants for vegetable crops.

The difficulty with the prior practice has been that the soil blocks had to be handled with extreme care and did not stand up well in shipping, i.e., the soil blocks would break up and drop away from the roots during handling and shipment.

One prior art method of handling such plants is to provide a plastic bag containing loose soil with the growing plant extending therefrom, examples of such systems being disclosed in U.S. Pat. No. 3,172,234 granted Mar. 9, 1965 to B. W. Eavis and U.S. Pat. No. 3,362,106 granted Jan. 9, 1968 to J. E. Goldring. In yet another prior system, soil has been stabilized using plastic resins, examplars of such soil stabilizing materials and methods being disclosed in U.S. Pat. No. 3,336,129 granted Aug. 5, 1967 to R. A. Herrett et al, U.S. Pat. No. 3,373,009 granted Mar. 12, 1968 to M. E. Pruitt et al. and U.S. Pat. No. 3,472,644 granted Oct. 14, 1968 to R. Woodside et al. None of these prior soil stabilizing methods has stabilized the soil with the growing plants therein, because certain of the ingredients present during the reaction of the stabilizing resins are injurious and fatal to growing plants. Specifically, one of the common solvents used in the resin systems for stabilizing soils is acetone, acetone being highly toxic to plants, see *An Introduction To Bacterial Physiology*, by E. L. Oginsky et al, W. H. Freeman & Company, San Francisco, 1954, see page 99.

SUMMARY OF THE INVENTION

The present invention provides a polymerized soil plug with a growing plant therein, and a method of making such a plug, as well as a package for storage and sale of such soil plugs, and hangers and plagues for utilizing such soil plugs.

It is an important object of the present invention to provide a growing plant molded therein comprising a body of spongy open-celled hydrophilic polymer, a growing plant having the roots thereof in the body of sponge-like polymer and having the stalk thereof extending outwardly from one surface of the body of sponge-like polymer, and a quantity of particles of soil mix distributed throughout the body of spongy polymer, a quantity of synthetic organic plastic resin being reacted in situ to form the body of spongy open-celled hydrophilic polymer binding the particles of soil mix therein and into a plug and binding the roots in the soil plug, the soil mix comprising from about 20% to about 80% by dry weight of the soil plug, the roots being distributed substantially uniformly throughout the adjacent portions of the soil plug and the stalk being intimately surrounded by the soil plug, whereby to provide a unitary self-supporting polymerized soil plug with a growing plant having its roots molded therein and its stalk molded therein and extending from one surface thereof.

Another object of the invention is to provide a polymerized soil plug of the type set forth, wherein the quantity of soil mix collectively has a porosity maintenance capacity and a water holding capacity and an ion exchange capacity and a pH buffering capacity.

Yet another object of the invention is to provide a package of a polymerized soil plug as set forth above, wherein the package comprises a hermetically sealed flexible transparent envelope, a soil plug essentially saturated with water providing moisture for the growing plant therein, and an atmosphere enriched with carbon dioxide within the sealed envelope and in contact with the tops of the growing plant.

Still another object of the invention is to provide a method of forming a polymerized soil plug with a growing plant molded therein comprising the steps of providing a mold open at the upper end and closed at the lower end thereof, applying a resin release agent to the inner surfaces of the mold, providing a quantity of particles of soil-mix and a quantity of synthetic organic plastic resin, forming an aqueous slurry of the soil mix and the synthetic organic plastic resin, placing a quantity of the slurry in the mold and placing the roots of the growing plant in the slurry in the mold, supporting the growing plant with the stalk extending from the upper surface of the slurry while the resin reacts in situ to form a spongy open-celled hydrophilic polymer binding the quantity of particles of soil mix therein and into a plug and binding the roots in the plug.

Yet another object of the invention is to provide a hanger for growing plants comprising a quantity of particles of soil mix bound in a body of spongy open-celled hydrophilic polymer of synthetic organic plastic resin, an attachment member affixed to the body and extending outwardly therefrom for mounting the body on a support, a plurality of openings in the sides of the body for receiving growing plants therein, the upper end of the body having a well for water therein with at least the lower surface thereof in contact with the body to supply water through the body to the plants in the openings, and a catch basin disposed beneath and affixed to the body for catching and holding water dripping therefrom.

In connection with the foregoing object, it is another object of the invention to provide a hanger of the type set forth having a plurality of porous plugs respectively disposed in the openings and each having a growing plant therein receiving water from the well through the body and the associated porous plugs.

A further object of the invention is to provide a plaque for growing plants comprising a container having a base and a side wall surrounding the base, a body of sponge-like open-celled hydrophilic polymer having a quantity of particles of soil mix disposed in the container and bound into a cohesive mass and to the container by the open-celled hydrophilic polymer, and a plurality of openings in the surface of the body for removably receiving porous plugs having growing plants therein and extending therefrom.

Further features of the invention pertain to the particular arrangement of the parts of the soil plugs and the packages therefor and the hangers and plaques, and to the particular details of the steps of the methods of forming such polymerized soil plugs, whereby the above outlined and additional operating features thereof are attained.

The invention, both as to its organization and method of operation, together with further features and advantages thereof will best be understood with reference to the following specification taken in connection with the accompanying drawings.

DESCRIPTION OF THE PREFERRED EMBODIMENTS

Figures 1, 2, 3, 4, 5, 6:
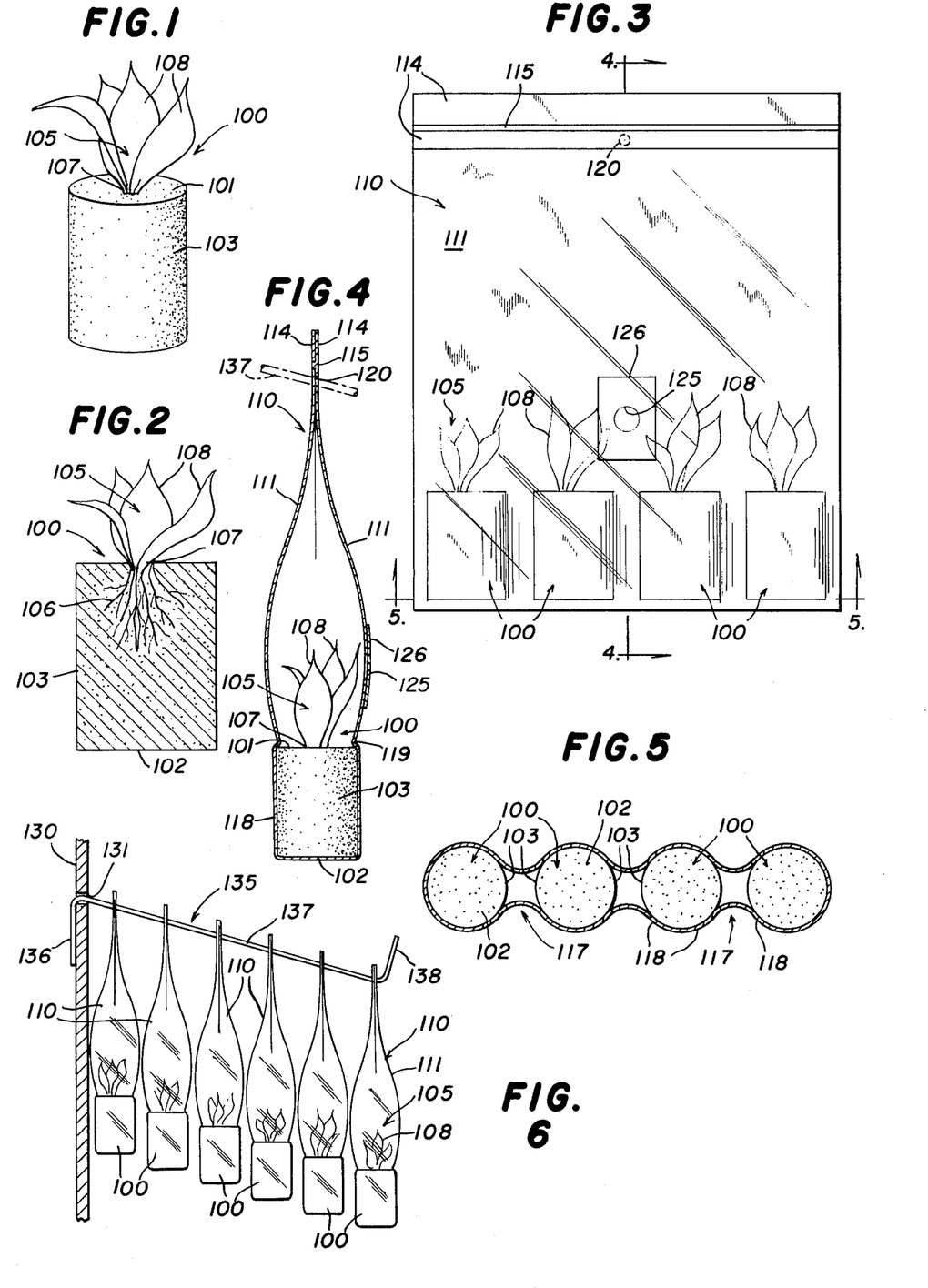
FIG. 1 is a perspective view of a polymerized soil plug with a growing plant therein made in accordance with and embodying the principles of the present invention.
FIG. 2 is a view in vertical section through the soil plug of FIG. 1.
FIG. 3 is an elevational view of a plastic package containing several of the soil plugs of FIG. 1.
FIG. 4 is a view in vertical section along the line 4—4 of FIG. 3.
FIG. 5 is a view in longitudinal section along the line 5—5 of FIG. 3.
FIG. 6 is a side elevational view of a display rack with a plurality of the packages of FIG. 3 hanging thereon.
Figure 7:
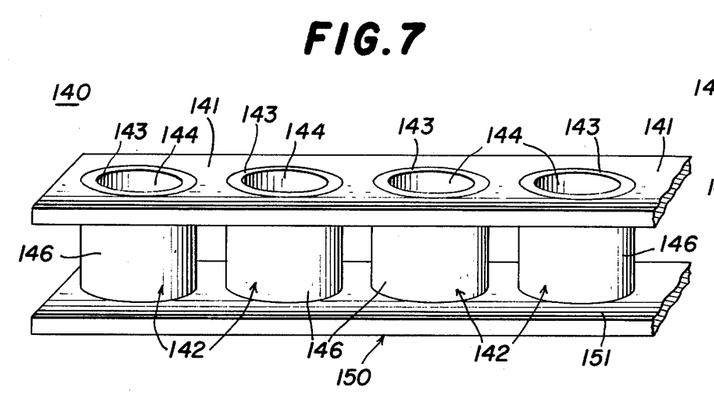
FIG. 7 is a perspective view of a set of molds for forming the polymerized soil plug of FIG. 1.
Figure 8:
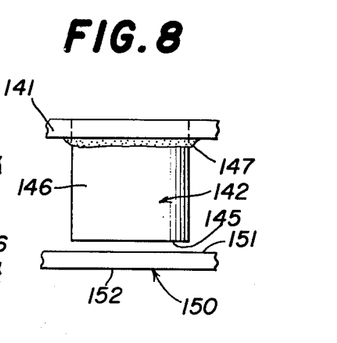
FIG. 8 is an end view from the left of the mold set of FIG. 7.
Figure 9:
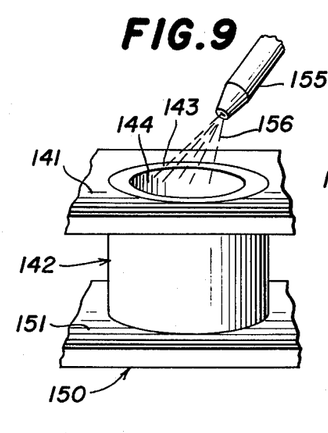
FIGS. 9 through 14 illustrate the steps in the making of the polymerized soil plug of FIG. 1.

Referring to FIGS. 1 and 2 of the drawings, there is illustrated a polymerized soil plug with a growing plant therein made in accordance with and embodying the principles of the present invention. The soil plug 100 is generally cylindrical in shape and has a flat top 101, a flat bottom 102 and a cylindrical side wall 103. Molded in the soil plug 100 is a growing plant 105, the plant 105 including roots 106, a stalk 107 and a top or leaves 108. In accordance with the present invention, the roots 106 are distributed in the adjacent portions of the soil plug 100 and are molded therein. The stalk 107 is also molded in the soil plug 100 but extends through the top 101 so that the leaves 108 of the plant 105 are exposed to sunlight in the usual manner.

The soil plug 100 is formed of a body of spongy open-celled hydrophilic polymer which binds a quantity of particles of soil mix into a cohesive mass to form the soil plug 100. The preferred polymer is formed of a synthetic organic plastic resin, such as a polyurethane resin, which provides an open-celled spongy body extending throughout the soil plug 100. Such an open-celled polymer securely holds the particles of soil materials in place to prevent loss thereof and to prevent dusting of the surrounding areas, all while providing a good porosity. As a result, the soil plug 100 has a good porosity maintenance capacity, has a good water holding capacity, and the soil mixes are chosen so as to provide a good ion exchange capacity and a good pH buffering capacity in the soil plug 100, all as will be described more fully hereinafter.

There is illustrated in FIGS. 3 through 6 of the drawings a novel package for merchandising the soil plugs 100 having the growing plants 105 molded therein. As illustrated, the package includes a plastic bag 110 that is generally rectangular in shape and has two opposed side panels 111 integrally joined at the bottom and the side edges thereof. A heavier portion 114 is provided at the upper end of each of the side panels 111, and disposed in the heavier portions is a closure 115, the closure 115 being preferably of the reusable type which when closed provides a hermetic seal for the bag 110, but which can be opened to permit placement of contents into the bag or removal of contents therefrom, after which the closure 115 can be operated to again provide a hermetic seal for the bag 110.

As illustrated, four of the soil plugs 100 with growing plants 105 therein have been illustrated disposed in the bottom of the bag 110. It will be understood that only a single soil plug 100 may be provided, or a larger number of soil plugs 100 may be provided within a bag such as the bag 110, the size of the bag 110 being adjusted accordingly. The bag 110 is formed of a synthetic organic plastic resin which is of the heat-shrinkable type, as is well known in the art, and the lower portions of the bag 110 have been illustrated as being heat shrunk as at 117 (see FIG. 5) so that the plastic of the bag 110 is shrunk around the soil plugs 100 to provide surrounding portions 118 and overlying portions 119 overlying the upper surfaces 101 of the soil plugs 100, whereby firmly to trap and retain the soil plugs 110 in the desired position in the bottom of the bag 110.

Referring to FIGS. 3 and 4, the heavier portions 114 are provided with thinned areas 120 that are in alignment with each other, one each in the side panels 111, the thinned areas 120 being adapted to be punctured by a support on which the package, i.e., the plastic bag 110 is to be hung. Puncture of the thinned areas 120 also opens up the interior of the plastic bag 110 to the atmosphere. There further is provided a ventilating opening 125 in at least one of the side panels 111, the ventilating opening 125 being adjacent to the tops 108 of the plants within the plastic bag 110. During storage and shipment, the opening 105 is covered by a strip 126 that is adhesively secured to the outer surface of the associated side panel 111.

There is illustrated in FIG. 6 of the drawing a display board 130 that is typical of the manner in which the plastic bags 110 are to be hung and displayed in a retail outlet. The display board 130 is oriented essentially vertically and has at least one hole 131 therein. Mounted upon the display board 130 is a display hook 135, the display hook 135 having a mounting end 136 which is integrally joined to a display rod 137 at one end thereof, the display rod 137 at the other end thereof having an upturned retaining end 138. The angle between the mounting end 136 and the display rod 137 is acute, with the adjacent portion of the display rod 137 extending through the opening 131 to mount the display hook 135 upon the display board 130. Because of the acute angle between the mounting end 136 and the display rod 137, the display rod 137 extends outwardly and downwardly from the display board 130, the retaining end 138 being arranged at substantially right angles with respect to the display rod 137. When it is desired to hang one of the plastic bags 110 upon the display hook 135, the outer end of the retaining end 138 is pressed against the thinned areas 120 to puncture holes therein, after which the plastic bag 110 is moved to a display position upon the display rod 137 as illustrated in FIG. 6. Because of the downwardly inclined position of the display rod 137, each of the tops 108 in each of the plastic bags 110 is exposed to natural or artificial sunlight during display.

In accordance with the preferred embodiment of the present invention, the interior of the hermetically sealed plastic bag 110 is provided with a special atmosphere in order to accommodate the growing plants 105 that are sealed therein. In addition, the pressure of the atmosphere within the plastic bag 110 is greater than that expected to be encountered on the exterior of the plastic bag 110, whereby to hold the bag in an extended position as illustrated in FIG. 4 and away from the growing tops 108 of the plants 105. The controlled atmosphere within the hermetically sealed bag 110 is preferably enriched in carbon dioxide and depleted in oxygen as compared to the normal atmosphere. More specifically, the carbon dioxide content is augmented so that it comprises 0.4% by volume, while the oxygen is reduced to 10% by volume, the balance being notrogen. The carbon dioxide content can be in the range from about 0.3% to about 1.0% by volume, while the oxygen content may be in the range from about 5% to about 30% by volume, the balance being notrogen in all cases. This atmosphere prolongs the life of the plant 105 during storage and shipment. For example, most plants can be maintained about 7 days in this controlled atmosphere with no light and from about 2 to 3 weeks if periodically exposed to light in accordance with the individual requirements of the particular species of plant.

In addition to the controlled atmosphere within the plastic bag 110, the soil plugs 100 are preferably saturated with water to insure that adequate moisture will be present during storage and shipment of the plants 105.

Upon arrival at the place of retail sale, the plastic bags 110 are placed upon a hanger such as the display hook 135. In placing a plastic bag 110 upon the display hook 135, an opening is formed at the thinned areas 120 by pushing the end 138 therethrough. To insure good ventilation through the plastic bag 110, the strip 126 is removed to expose the ventilating opening 125, thereby to insure a good flow of air from without the plastic bag 110 through the opening 125 into the plastic bag 110 and then out through the opening formed by puncturing the thinned areas 120. This structure insures that the plants 105 will survive for up to 3 months on display with only a minimum of attention, such as supplying additional water to the soil plugs 100. It will be seen that the storage life, transportation life and the shelf life of growing plants 105 is materially extended by use of the novel plastic bag 110 and display system illustrated. Furthermore, the plants are protected during storage and transportation, i.e., before puncturing at the thinned portion 120 and removal of the strip 126, by the above atmospheric pressure within the hermetically sealed plastic bag 110. For example, the pressure within the plastic bag 110 may be from about 0.1 to about 2 lbs. per inch greater than the prevailing atmospheric pressure surrounding the plastic bag 110.

Referring to FIGS. 7 to 14 of the drawings, the molding apparatus 140 for forming the polymerized soil plug 100 with a growing plant 105 therein will be described in detail. The molding apparatus 140 includes a carrier 141 in the form of a elongated essentially rigid strip having a plurality of openings therein into which are inserted the ends of a plurality of molds 142. The upper end or top surfaces 143 of the molds 142 are positioned flush with the upper surface of the carrier 141 and are secured thereto as at 147 by any suitable means such as an adhesive. The openings in the carrier 141 are circular and the molds 142 are cylindrical and are sized to just fit within the openings in the carrier 141. The molds 142 have an inner molding surface 144 and a bottom surface 145 as well as an outer surface 146. Cooperating with the bottom surfaces 145 of the molds 142 is a bottom plate 150 having a top surface 151 and a bottom surface 152, the top surface 151 being smooth and cooperating with the bottom surfaces 145 of the molds 142 temporarily and releasably to close the lower ends of the molds 142 during the molding operation.

In carrying out the molding method of the present invention, a resin release agent is first sprayed upon the surfaces of the molding apparatus 140 and which may come in contact with the resin used to bind the soil-like materials into the soil plugs 100. This operation is diagrammatically illustrated in FIG. 9 of the drawings, wherein a spray nozzle 155 is shown spraying a stream 156 of release agent onto the inner surfaces 144 of the mold 142, and also upon the surfaces 141, 142, 143, 145 and 151, as required. Any suitable release agent may be utilized, but much preferred results are obtained by using a release agent comprising lecithin. The lecithin is preferably applied in an alcohol-water solution, 50 grams of lecithin being dissolved in 500 ml. of water, after which 25 ml. of isopropyl alcohol are added to provide the release agent solution. Methyl alcohol, ethyl alcohol and acetone may be utilized in lieu of the isopropyl alcohol in the solution. Instead of being sprayed upon the appropriate surfaces, the release agent solution may also be applied by brushing dipping and the like. After application, the release agent solution is allowed to air dry, thereby to leave a thin film of lecithin as a release agent on the surfaces of the molding apparatus 140.

Figure 10:
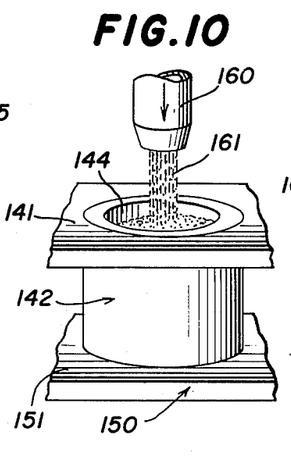
Figure 11:
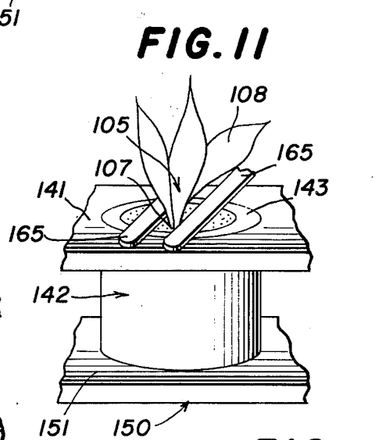
Figure 12:
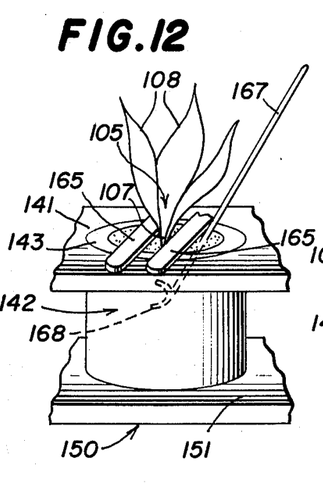
Figure 13:
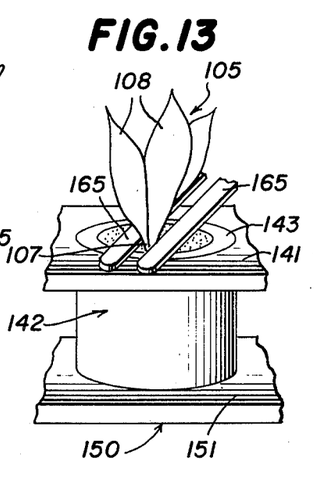
Figure 14:
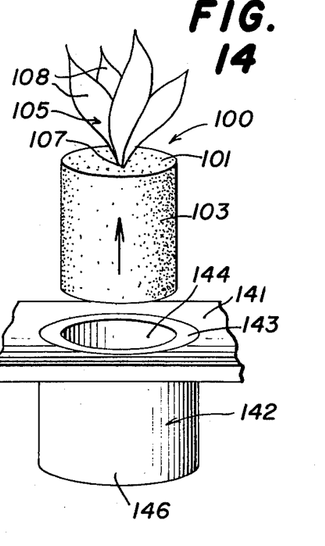

Referring to FIG. 10 of the drawings, there is diagrammatically illustrated the addition of a quantity of slurry through a nozzle 160 in the form of a stream 161, the slurry stream 161 being applied to fill each mold 142 up to a point spaced a short distance below the top surface 143 thereof. Thereafter the plant 105 is placed in the body of slurry within the mold 142, the plant 105 having its roots disposed in the slurry 161 with the stalk extending downwardly into the slurry and then upwardly above the top surface thereof with the top 108 being held in the proper position by a pair of support fingers 165 which may rest upon the upper surface of the carrier 141. In addition, the roots of the plant 105 are spread and distributed in the adjacent portions of the slurry by use of a stirrer 167 having a U-shaped end 168 thereon, as diagrammatically illustrated in FIG. 12 of the drawings. After the roots have been distributed and the stirrer 167 withdrawn from the slurry, the resin in the slurry is permitted to react in situ and the various parts are left as in FIG. 13 until the slurry has set up to a solid cohesive mass, this requiring from about ½ minute to 10 minutes depending upon the composition of the slurry and the temperature during the reaction. After the slurry has set up to form soil plug 100, the soil plug 100 with the plant 105 molded therein is removed from the mold 142 by withdrawing the bottom plate 150 to expose the lower open end of the mold 142, after which the soil plug 100 may be pushed upwardly and out of the mold 142 as is diagrammatically illustrated in FIG. 14. The resultant product is a cohesive self supporting polymerized soil plug 100 with the growing plant 105 molded therein, more specifically, the roots 106 of the plant are molded in the soil plug 100 as is the stalk 107, the stalk 107 extending upwardly through the top 101 of the soil plug 100 and supporting the top or leaves 108 as illustrated.

The following is a specific example of a resin and soil mix slurry useful in carrying out the method illustrated in FIGS. 7 to 14.

EXAMPLE 1

A soil mixture is provided including a natural organic soil, an agricultural modified mineral, fertilizers, and pH control agents, as follows:

| | |
|---|---|
| Peat Soil | 78. lbs. |
| Vermiculite | 19. lbs. |
| Bone Meal | 0.5 lb. |
| Dolomitic Lime | 0.75 lb. |
| Fertilizer (5-10-5) | 0.75 lb. |
| "Mag Amp" Fertilizer | 1. lb. |
| | 100. lbs. |

The above described soil mixture was then incorporated into a slurry having the following composition:

| | |
|---|---|
| Soil Mixture (50% Moisture) | 32.7 lbs. |
| Polyurethane Resin-Forming Solution | 9.6 lbs. |
| Water | 57.7 lbs. |
| | 100.0 lbs. |

The soil mixture and water were thoroughly mixed after which the resin solution was added to provide a slurry, the temperature of the slurry being kept at about 5° C. by supplying a portion of the water as ice. The resultant slurry was utilized as described above with respect to FIGS. 10–14 to form a soil plug 100 having a plant 105 molded therein. The time required from preparation of the slurry to solidification thereof to form the soil plug was about 10 minutes at an ambient temperature of 25° C.

In the soil mixture of Example 1, the peat soil comprises a relatively undecomposed organic soil which includes more than about 50% by weight of combustible materials. The peat provides physical structure including maintenance of porosity and water holding capacity in the finished soil plug 100. The peat soil also provides an ion exchange capacity and serves as a source of notrogen as well as pH buffering capacity. Teh Vermiculite also provides physical structure including porosity and water holding capacity as well as some ion exchange capacity. The Vermiculite is particularly useful in rendering the surfaces of the soil plug 100 water permeable, whereby water applied to the surface of the soil plug 100 penetrates throughout the mass thereof. The bone meal provides a slowly available phosphorus source while the dolomitic lime provides pH control and a slowly available source of calcium and magnesium. The fertilizer provides an immediate source of notrogen, phosphorus and potassium, while the "Mag Amp" provides a slowly available source of fertilizer elements. The proportions between the peat and the Vermiculite can be changed while maintaining a useful composition for the soil mixture, all as is understood by those skilled in the art. Likewise the amount of the other ingredients can be varied while providing a suitable soil mixture.

In lieu of the peat soil in Example 1, a muck soil may be utilized, muck soil being an organic soil sufficiently decomposed so that there are less than 50% by weight of combustible materials therein. Synthetic organic soil substitutes also may be provided, and preferably the soil substitutes are composted in the usual manner. In place of the Vermiculite, Perlite may be utilized, the agricultural grade having a small particle size being preferred.

In general, any combination of soils, natural and synthetic, together with modified minerals, if desired, is useful provided that the resultant soil mixture exhibits porosity maintenance capacity, water holding capacity, ion exchange capacity and pH buffering capacity. The soil mixture should also be initially resilient and be thoroughly mixed and essentially homogeneous throughout. It will be appreciated that fertilizer elements need not be incorporated into the soil mixture, but may be added thereto in aqueous solution after formulation of the soil plug 100 as required during the growth of the plant 105. The term "soil-mix" is used herein to refer to and mean either a single soil or a combination of soils or a mixture and combination of soil or soils with other soil-forming material such as Vermiculite and Perlite, as well as various fertilizer ingredients.

The resin solution of Example 1 is a polyurethane resin prepolymer solution sold by the 3M Company under the designation "XB-2382", and is a reaction product of toluene diisocyanate and a polyester having unreacted hydroxyl groups thereon such as polyoxyethylene diols, 66 parts by weight of the prepolymer being dissolved in 34 parts by weight of acetone; therefore in the 9.6 parts by weight of prepolymer resin solution of Example 1, 6.3 parts by weight are prepolymer and 3.3 parts by weight is acetone. The resin forming ingredients or prepolymer react in the presence of water and with water to provide a polyurethane resin accompanied by the evolution of carbon dioxide gas, thereby to provide an open-celled hydrophilic polymer as the reaction product. In the slurry, the resin forming ingredients react throughout the slurry mass so as to incorporate the soil ingredients in an open-celled network of polyurethane resin, thereby to impart to the completed soil plug all of the desirable plant growing characteristics of a good soil, namely, porosity maintenance capacity, water holding capacity, ion exchange capacity and pH buffering capacity. Further details of the prepolymer are set forth in U.S. Pat. No. 3,805,532 (particularly Example 1), and the disclosure thereof is incorporated herein by reference.

Other resin-forming systems may be utilized so long as they result in a continuous phase of resin that is open-celled and hydrophilic in character. For example, the various resin foam systems set forth in U.S. Pat. No. 3,373,009 may be utilized, and the disclosure thereof is hereby incorporated herein, provided that the resin formulations are modified to incorporate them into a slurry as specified above with respect to Example 1.

The temperature at which the molding operation can be carried out may be varied from about 5° C. to about 20° C., with the curing time being inversely proportional to the temperature, i.e., the curing time being approximately 10 minutes at 5° C. and approximately ½ minute at 20° C.

In making the slurry of Example 1, the soil mixture is first dispersed in the water, the water being added to the soil mixture until the resultant slurry begins to break, the slurry having a consistency like that of cake batter, whereby it readily flows and fills all areas of an associated mold. Thereafter the polyurethane resin-forming solution is added, the amount of resin-forming solution utilized being such that the resultant soil plug 100, on a dry basis, comprises from about 20% by weight to about 80% by weight of polyurethane resin, and likewise contains from about 20% by weight to about 80% by weight of soil particles. Preferably the ratio between the water and the polyurethane resin-forming solution varies from about 1:1 to about 8:1. If the ratio of water to polymer falls below 1:1, the resultant soil plug has a surface characteristic such that water penetration is poor, and the soil plug also has a very high shrink coefficient when dried. If the ratio between the water and the resin-forming solution is greater than 8:1, the water in the slurry tends to separate out and the resin and soil particles float to the top of the slurry, and the resultant soil plug has voids therein, i.e., is not of uniform consistency throughout the mass thereof. A preferred viscosity of the slurry at the time of molding is in the range from about 100 centipoises to about 200 centipoises.

The resultant soil plug 100 is a polyurethane resin foam forming a continuous phase throughout the soil plug, the foam being spongy, open-celled and hydrophilic in character. The soil particles are dispersed throughout the polyurethane foam, yet water in the polyurethane foam has access to the soil particles so that the soil particles perform the usual soil functions during the growth of plants in the soil plug 100. The soil plug 100 has an apparent density of about 0.2 gms. per cc., and may vary from about 0.18 gms. per cc. to about 0.3 gms. per cc. The soil plug can absorb about three times its weight of water, thereby demonstrating that the soil plug 100 is open-celled and has a substantial volume of voids therein.

Contrary to the expectation of those skilled in the art, the acetone in the slurry of Example 1 does not injure the plant 105 in any respect during the molding thereof into the soil plug 100. Although the acetone is present in substantial quantities, and is highly noticeable in the atmosphere during the molding operation, no toxic effect on the plants 105 has been found in carrying out the process of the present invention to produce the soil plug 100.

Although essentially any growing plant may be used as the plant 105 in the soil plug 100, the method of the present invention is most applicable to those plants which cannot be handled in the bare-rooted condition. In general, the method is useful in connection with bedding plants, foliage plants both those grown from seed and those grown from cuttings, nursery stock and field transplants. Among the bedding plants most useful in the present invention are petunias, marigolds, fibrous rooted begonias, pansies, impatiens and snapdragons.

Among the foliage plants grown and customarily transplanted, those that are particularly useful in the present invention are schefflera, cactus, philodendron, ficus, asparagus ferns, bromeliods, anthurium, Norfolk Island pine, and palms. Among the foliage plants customarily propogated by cuttings, those most useful in the present invention are fern, ivy, philodendron, cryptanthus, sansevieria, ficus species, zebrina pendula and dieffenbachia. Sansevieria is the plant illustrated in the drawings of the present application.

Nursery stock most usefully handled by the method of the present invention are those that cannot be handled in bare-rooted condition. Examples of such are pine, juniper, eucalyptus and taxus.

Many plants that are to be grown as fruits and vegetables are started in a greenhouse and then transplanted to the field, commonly referred to as field transplants, and many of these plants need or benefit from a non-friable and intact soil block around the roots during transplant. Examples of such plants are tomatoes, broccoli, cabbage, peppers, watermelons and cantelopes.

Other soils and soil mixes in addition to those discussed above with respect to Example 1 are useful in the invention of the present application. In general, all mineral soils are useful herein and can be suitably bound using the open-celled hydrophilic polymer to bind the soil ingredients into a coherent mass. For example, fine gravels having a size of 1 to 2 mm. are useful, coarse sand having a size of 0.5 to 1.0 mm., medium sand having a particle size of 0.25 to 0.5 mm., fine sands having a particle size from 0.10 to 0.25 mm., very fine sands having a particle size of 0.05 to 0.10 mm., slits having a particle size of 0.005 to 0.05 mm. and clayshaving particle sizes of 0.005 mm. and below are all useful herein.

The synthetic organic soil substitutes are also useful. A first type is that comprised of pine barks, wood shavings, sawdust, redwood chips, peanut hulls, pecan shells, straw, leaves or similar organic materials, provided they are reduced in particle size to dimensions useful as rooting media. All of these materials also are useful if composted, subjected to bacterial reduction, and the like, i.e., composted barks, leaf molds, etc. Also useful are sewage wastes and composted sewage wastes as well as animal manures and composted animal manures. Likewise useful are ground garbage and composted ground garbage, as well as fungal and bacterial residues.

The following are additional specific examples of soil mixtures and slurries useful in carrying out the present invention.

EXAMPLE 2

The method of Example 1 was utilized but the peat soil and Vermiculite were omitted and in their place was used 97 lbs. of ground spaghum. The resultant soil plug had all of the desirable characteristics of the soil plug 100 formed utilizing the method of Example 1.

EXAMPLE 3

The procedure of Example 1 was utilized, but the soil peat and Vermiculite were omitted and in their place there was used 97 lbs. of ground composted pine bark. The resultant soil plug had all of the advantages and characteristics described above with respect to the soil plug 100 formed utilizing the method of Example 1.

EXAPLE 4

The following soil mixture was provided:

| Soil | Quantity |
| --- | --- |
| Peat | 68 lbs. |
| Vermiculite | 17 lbs. |
| Sewage Sludge | 15 lbs. |
| | 100 lbs. |

The above ingredients were mixed and incorporated into a slurry as described above with respect to Example 1. The resultant soil plug had all of the desirable characteristics and properties described above with respect to the soil plug 100 produced utilizing the method of Example 1. The sewage sludge provides the fertilizers required in the soil plug.

EXAMPLE 5

A soil mixture was provided having the following composition:

| | |
| --- | --- |
| Straw Composted With Sewage Sludge (for 6 months to one year) | 79 lbs. |
| Vermiculite, Agricultural Grade | 20 lbs. |
| Bone Meal | 0.5 lbs. |
| Dolomitic Lime | 0.5 lbs. |
| | 100 lbs. |

This mixture was utilized in the same slurry as in Example 1. The resultant soil plug had all of the advantages and properties discussed above with respect to the soil plug 100 produced using the method of Example 1.

EXAMPLE 6

The following soil mixture was provided:

| | |
| --- | --- |
| Peat Soil | 33 lbs. |
| Fine Sand | 33 lbs. |
| Silt Loam Soil | 33 lbs. |
| Fertilizer (5-10-5) | 1 lb. |
| | 100 lbs. |

The soil mixture was utilized in the slurry having a composition of Example 1. The resultant soil plug had all of the desirable properties and characteristics described above with respect to the soil plug 100 formed using the method of Example 1.

EXAMPLE 7

The soil mixture of Example 1 was utilized in a slurry having the following composition:

| | |
| --- | --- |
| Soil Mixture (50% Moisture) | 29.8 lbs. |
| Polyurethane Resin-Forming Solution | 17.5 lbs. |
| Water | 52.7 lbs. |
| | 100.0 lbs. |

The resultant soil plug from Example 7 had all of the desirable characteristics and properties of the soil plug 100 made using the method of Example 1. The resultant soil plug from Example 7 had a lower soil mixture content and a higher resin content on a dry weight basis than the soil plug 100 from Example 1, i.e., the soil plug 100 of Example 1 had a soil mixture content of about 72% on a dry weight basis and a resin content of about 28%, whereas the soil plug from Example 7 had a soil mixture content of about 56% on a dry weight basis and a resin content of about 44%. The acetone concentration in the slurry of Example 7 is about 6% by weight which is higher than the acetone concentration of about 3.3% in the slurry of Example 1. Despite the higher concentration of acetone, there was no deleterious effect upon the growing plant 105 molded into the soil plug from Example 7.

EXAMPLE 8

The soil mixture of Example 1 was mixed with the ingredients indicated to provide the following slurry:

| | |
| --- | --- |
| Soil Mixture (50% Moisture) | 33.5 lbs. |
| Polyurethane Resin-Forming Solution | 7.4 lbs. |
| Water | 59.1 lbs. |
| | 100.0 lbs. |

The soil plug formed from this slurry had all of the desirable properties and characteristics of the soil plug 100 made using the slurry of Example 1. The soil mixture content of the soil plug of Example 8 is about 77% on a dry weight basis and the resin content of the soil plug of Example 8 is about 23%.

EXAMPLE 9

The following ingredients were mixed to form a slurry:

| | |
| --- | --- |
| Soil Mixture (50% Moisture) | 16.6 lbs. |
| Polyurethane Resin-Forming Solution | 41.7 lbs. |
| Water | 41.7 lbs. |
| | 100.0 lbs. |

The slurry of Example 9 was utilized to form a soil plug in accordance with the method of Example 1. The resultant soil plug had the desirable properties and characteristics set forth above with respect to the soil plug 100 of Example 1. The soil mixture content of the soil plug of Example 9 is about 23.3% on a dry weight basis and the resin content of the soil plug of Example 9 is about 76.7% on a dry weight basis.

Figures 15, 16, 17, 18, 19, 20, 21, 22:
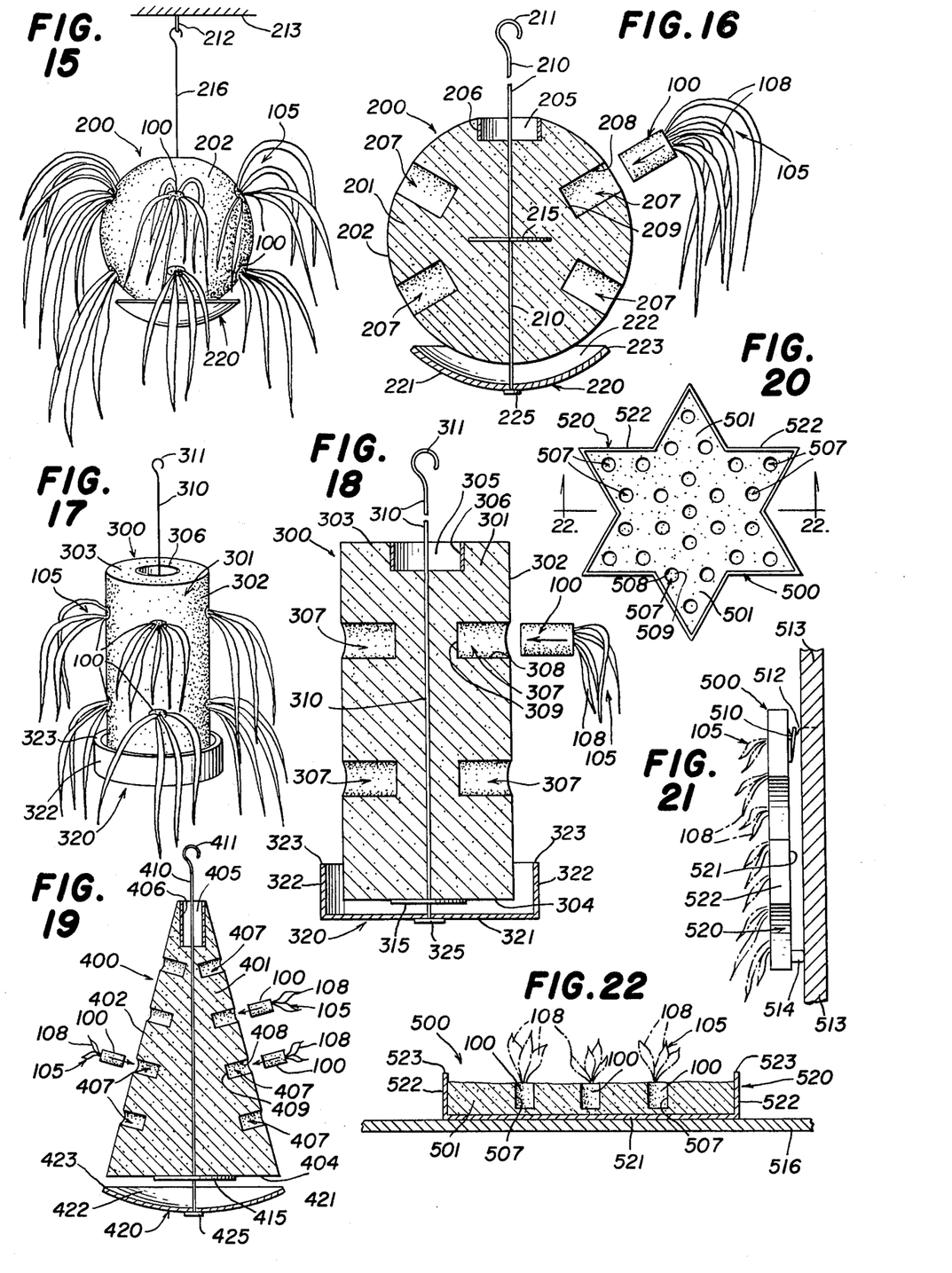
FIG. 15 is a perspective view of a first form of hanger made in accordance with and embodying the principles of the present invention.
FIG. 16 is a view in vertical section through the hanger of FIG. 15.
FIG. 17 is a perspective view of a second form of hanger made in accordance with the present invention.
FIG. 18 is a view in vertical section through the hanger of FIG. 17.
FIG. 19 is a view in vertical section through a third form of hanger made in accordance with and embodying the principles of the present invention.
FIG. 20 is a plan view of a plaque made in accordance with and embodying the principles of the present invention.
FIG. 21 is a side view of the plaque of FIG. 20 showing it in position upon a vertical support wall.
FIG. 22 is a view in section along the line 22-22 of FIG. 20.

Referring to FIGS. 15 and 16 of the drawings, there is disclosed a decorative hanger for holding growing plants, the hanger being generally designated by the numeral 200. The hanger 200 comprises a body made of the same material as the soil plug 100 described above, i.e,, a quantity of particles of soil-like material having distributed through an open-celled hydrophilic polymer that binds the soil-like material into a cohesive self-supporting body. The sphere 200 has an outer spherical surface 202 having formed therein a water well 205 at the upper end thereof (see FIG. 16), the water well 205 having a sleeve or bushing 206 lining the vertical extending wall thereof, the sleeve 206 being impervious to water whereby water placed in the well 20t can escape therefrom only through the bottom surface and into the body of the hanger 200. A plurality of sockets 207 is provided over the surface of the sphere 201, the sockets being cylindrical in shape and having the longitudinal axes thereof disposed radially with respect to the sphere 201. Each of the sockets 207 has a side wall 208 that is cylindrical in shape and a bottom wall 209 that is circular in shape.

Molded in the sphere 201 is an attachment member 210 that is illustrated as being in the form of a rod extending along a diameter of the sphere 201 and through the center of the water well 205 and outwardly beyond the surface 205 at both ends thereof. The end of the member 210 extending through the water well 205 is provided with a hook 211 useful in being engaged by another hook or eye 212 attached to an overhead or ceiling 213. Formed integral with the attachement member 210 is a support member 215 circular in shape and formed as a plate and integrally molded into the center of the sphere 201. The lower end of the attachment member 210 carries a catch basin 220 that is part-spherical in shape. The catch basin 220 has an outer surface 221 that is partspherical in shape and an inner surface 222 that i partispherical in shape and terminates in an outer edge 223. The surfaces 221 and 222 have the same center of curvature as the spherical surface 202, but the edge 223 is disposed only a short way up the side of the sphere 201. A fastener 225 on the lowermost end of the attachment member 210 holds the catch basin 220 in the proper operative position beneath the sphere 201.

As illustrated, the sockets 207 each receive one of the soil plugs 100 with a growing plant 105 disposed therein. The surfaces of the soil plug 100 are in contact with the surfaces of the socket 207, whereby water can be fed from the well 205 through the sphere 201 to a socket 207 and then into the soil plug 100 to provide the water required for the growing plants 105. The user of the hanger 200 may replace the soil plugs 100 and the plants 105 therein when he dsires to change the decoration provided by the hanger 200, all without impairing the structural integrity of the hanger 200. It at any time excess water is provided to the hanger 200, i.e., if more water is provided than can be absorbed by the sphere 201, the soil plugs 100 and the plants 105, then the excess is collected in the catch basin 220, thereby preventing dripping of water from the hanger 200 with possible consequent damage to adjacent objects.

The attachment member 210 may be formed of steel as may the catch basin 220, but preferably the attachment member 210, the support member 215, the catch basin 220 and the fastener 225 are all formed of plastic and are readily interconnected. In addition, the surface 202 of the sphere 201 may be decorated before the soil plugs 100 are inserted by applying to the outer surface 202 thereof a varnish or other adhering substance such as the resin used in making the sphere 201. After applying the coating, the sphere 201 may be rolled in, or have otherwise applied thereto, colored sand or the like to provide a decorative coating on the surface 202 and around the sockets 207.

There is illustrated in FIGS. 17 and 18 of the drawings a second form of hanger 300 made in accordance with the present invention. The hanger 300 includes a cylinder 301 that is formed of the same material as the sphere 201 described above. The cylinder 301 has a side surface 302 that is cylindrical in shape, a flat top 303 and a flat bottom 304. There also is formed in the upper end a cylindrical water well 305 which is lined by a water impervious sleeve 306. Formed in the sides of the cylinder 301 is a plurality of sockets 307, each of the sockets 307 being cylindrical in shape and having the longitudinal axis thereof disposed radially with respect to the longitudinal axis of the cylinder 301, and substantially normal thereto. Each of the sockets 307 has a cylindrical side wall 308 and a bottom wall 309. Extending longitudinally through the cylinder 301 along the longitudinal axis thereof is an attachment member 310. The upper end of the attachment member 310 extends beyond the top surface 303 and carries a hook 311 useful in attaching the hanger 300 to an overlying support. Integrally connected to the attachment member 310 and contacting the bottom surface 304 of the cylinder 301 is a circular support member 315 that serves to position the cylinder 301 upon the attachment member 310. The attachment member 310 extends downwardly beyond the support member 315 and carries a catch basin 320 held in position thereon by a fastener 325. The catch basin 320 includes a flat circular bottom wall 321 extending outwardly beyond the side surface 302 of the cylinder 301 and carrying on the outer edge thereof an upstanding side wall 322 that surrounds the lower end of the cylinder 301 and has an upper edge 323 spaced from the sided surface 302 of the cylinder 301.

The sockets 307 are shaped and arranged to accommodate the soil plugs 100 having the growing plants 105 therein, the soil plugs 100 being inserted as indicated by the arrow in FIG. 18 into the sockets 307. Since the cylinder 301 and the soil plugs 100 are both porous and formed by an open-celled hydrophilic polymer, water applied in the well 305 is conducted downwardly through the cylinder 301 to the socket 307 and then into the soil plugs 100 and to the roots of the growing plants 105. Any excess water that flows downwardly through the cylinder 301 is caught by the catch basin 320, thereby to avoid damage to surrounding articles.

A third form of hanger 400 is illustrated in FIG. 19 of the drawings. The hanger 400 is in the form of a pyramidal cone 401 having a conical side surface 402 and a substantially flat bottom 404. A cylindrical water well 405 is formed in the upper end of the cone 401 and has the side wall thereof lined by a water impervious sleeve 406. A plurality of sockets 407 is provided in the cone 401, the sockets 407 being cylindrical in shape and having the longitudinal axes thereof disposed substantially normal the conical surface 402 and extending radially inwardly towards the longitudinal axis of the cone 401.

An attachment member 410 is molded in the cone 401 and extends along the longitudinal axes thereof and outwardly through the water well 405 and downwardly through the bottom 404. The upper end of the attachment member 410 carries a hook 411 for attachment to an overhead support. A plate-like circular support member 415 engages the bottom 404 of the cone 401 and is secured to the attachment member 410, thereby to position the cone 401 upon the attachment member 410. Also disposed below the bottom 404 is a catch basin 420 which is illustrated as being part-spherical in shape and being secured by a fastener 425 to the lower end of the attachment member 410. The catch basin 420 has a part-spherical outer surface 421 and a part-spherical surface 422 terminating in an upper edge 423 disposed a short distance radially outwardly with respect to the lower edge of the side surface 402 of the cone 401.

In use, soil plugs 100 carrying growing plants 105 are inserted as illustrated by the arrows into the associated sockets 407 of the cone 401. The sockets 407 are shaped and arranged neatly and snugly to receive the soil plugs 100. The plants 105 are watered by applying water to the water well 405, the water flowing downwardly through the porous cone 401 and into the sockets 407 and then into the soil plugs 100 so as to apply water to the roots of the growing plants 105. Any excess water flowing downwardly through the cone 401 is caught by the catch basin 420, thereby to prevent damage to surrounding items.

Referring to FIGS. 20 and 22 to the drawings, there is illustrated a plaque embodying therein the principles of the present invention. The plaque includes a container 520 having a base 521 shaped in any desired form, the shape of the base 521 illustrated in FIG. 20 being that of a six pointed star. Extending around the base 521 in an upstanding side wall 522 having an upper edge 523, the joint between the base 521 and the side wall 522 being water-tight. There is cast into the container 520 a sheet 501 of soil-like material polymerized by a synthetic organic resin that forms in situ an open-celled hydrophlic polymer that binds the soil-like material into a cohesive self-supporting body. The material of the sheet 501 may be of any of those from Examples 1 through 9 above, and the polymer also serves to attach the sheet 501 to the inner surfaces of the base 521 and the side wall 522. Formed in the sheet 501 is a plurality of sockets 507, each of the sockets 507 being cylindrical in shape and including a cylindrical side wall 508 and a bottom 509. The sockets 507 are shaped and arranged snugly to receive therein soil plugs 100 carrying growing plants 105.

The plaque 500 may be placed flat on a support surface such as 516 illustrated in FIG. 22. Alternatively, the container 520 may have a picture hanger attached to the rear thereof adjacent to the upper end as illustrated in FIG. 21 so that it can be placed upon a hook 512 on an associated vertical support wall 513. A finger 514 is also provided adjacent to the lower end of the container 520 in order to cause the plaque 500 to hang vertically with respect to the wall 513.

In use, the plaque 500 may have any number of decorative designs of plants formed therein by inserting different colors and textures of plants in the several sockets 507. Furthermore, the decorative effect can be changed by the user as desired in order to provide ever fresh designs of growing plants in the plaque 500.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. A polymerized soil plug with a growing plant molded therein comprising a body of spongy open-celled hydrophilic polymer, a quantity of particles of soil mix distributed throughout said body of spongy polymer, and a growing plant having the roots thereof in said body of spongy polymer and having the stalk thereof extending outwardly from one surface of said body of spongy polymer, a quantity of foam-forming synthetic organic plastic resin being reacted in situ to form said body of spongy open-celled hydrophilic polymer binding said particles of soil mix therein and into a plug and binding said roots in said plug, said soil mix comprising from about 20% to about 80% by dry weight of said soil plug, said roots being distributed substantially uniformly throughout the adjacent portions of said plug and said stalk being intimately surrounded by said plug, thereby to provide a unitary self-supporting polymerized soil plug with a growing plant having its roots molded therein and its stalk molded therein and extending from one surface thereof.

2. A polymerized soil plug with a growing plant molded therein set forth in claim 1, wherein said synthetic organic plastic resin and said particles of soil mix are mixed together in an acetone-water slurry and molded around said roots and said stalk.

3. The polymerized soil plug with a growing plant molded therein set forth in claim 1, wherein said soil plug has an apparent density on a dry basis of from about 0.18 gm. per cc. to about 0.3 gm. per cc.

4. The polymerized soil plug with a growing plant molded therein set forth in claim 1, wherein said soil plug in the dry condition can take up about 3 times its weight of water.

5. The polymerized soil plug with a growing plant molded therein set forth in claim 1, wherein said resin comprises from about 20% to about 80% by weight on a dry basis of said polymerized soil-plug excluding said growing plant.

6. The polymerized soil plug with a growing plant molded therein set forth in claim 1, wherein said synthetic organic plastic resin is a polyurethene resin.

7. The polymerized soil plug with a growing plant molded therein as set forth in claim 1, wherein said synthetic organic plastic resin is a reaction product of toluene diisodyanate with a polyester having unreacted hydroxyl groups thereon and water.

8. The polymerized soil plug with a growing plant molded therein set forth in claim 1, wherein said growing plant is a bedding plant.

9. The polymerized soil plug with a growing plant molded therein set forth in claim 1, wherein said growing plant is a plant grown from seed.

10. The polymerized soil plug with a growing plant molded therein set forth in claim 1, wherein said growing plant is a plant grown from a cutting.

11. The polymerized soil plug with a growing plant molded therein set forth in claim 1, wherein said growing plant is nursery stock that cannot be handled bare-rooted.

12. The polymerized soil plug with a growing plant molded therein set forth in claim 1, wherein said growing plant is a field transplant benefitting from an intact soil block.

13. A polymerized soil plug with a growing plant molded therein comprising a body of spongy open-celled hydrophilic polymer, a growing plant having a roots thereof in said body of spongy polymer and having the stalk thereof extending outwardly from one surface of said body of spongy polymer, and a quantity of particles of soil mix having collectively a porosity maintenance capacity and a water holding capacity and an ion exchange capacity and a pH buffering capacity and distributed throughout said body of spongy polymer, a quantity of foam-forming synthetic organic resin being reacted in situ to form said body of spongy open-celled hydrophilic polymer binding said particles of soil-like material therein and into a plug and binding said roots in said plug, said soil mix comprising from about 20% to about 80% by dry weight of said soil plug, said roots being distributed substantially uniformly throughout the adjacent portions of said plug and said stalk being intimately surrounded by said plug, thereby to provide a unitary selfsupporting polymerized soil plug with a growing plant having its roots molded therein and its stalk molded therein and extending from one surface thereof.

14. The polymerized soil plug with a growing plant molded therein set forth in claim 13, and further comprising a fertilizer source of nitrogen, phosphorus and potassium distributed throughout said body of spongy polymer.

15. The polymerized soil plug with a growing plant molded therein set forth in claim 13, and further comprising a slowly available source of calcium and magnesium distributed throughout said body of spongy polymer.

16. The polymerized soil plug with a growing plant molded therein set forth in claim 13, wherein said soil mix is a mineral soil.

17. The polymerized soil plug with a growing plant molded therein set forth in claim 13, wherein said soil mix is a mixture of a natural organic soil and an agricultural modified mineral selected from the group consisting of Perlite and Vermiculite.

18. The polymerized soil plug with a growing plant molded therein set forth in claim 13, wherein said soil mix is a synthetic organic soil substitute.

19. The polymerized soil plug with a growing plant molded therein set forth in claim 13, wherein said soil mix is a mixture of a natural organic soil, an agricultural modified mineral selected from the group consisting of Perlite and Vermiculite, and sewage sludge.

20. A package of a polymerized soil plug with a growing plant molded therein, said package comprising a hermetically sealed flexible transparent envelope, a polymerized soil plug having a substantial water holding capacity and disposed within said envelope, said soil plug including a body of spongy open-celled hydrophilic polymer and a quantity of particles of soil mix distributed throughout said body of spongy polymer, a growing plant having the roots thereof in said polymerized soil plug and having the stalk thereof extending outwardly from one surface of said polymerized soil plug, a quantity of foam-forming synthetic organic plastic resin being reacted in situ to form said body of spongy open-celled hydrophilic polymer binding said particles of soil mix therein and into a plug and binding said roots in said plug, said soil mix comprising from about 20% to about 80% by dry weight of said plug, said roots being distributed substantially uniformly throughout the adjacent portions of said plug and said stalk being intimately surrounded by said plug, said polymerized soil plug being essentially saturated with water providing moisture for said growing plant, and an atmosphere enriched in carbon dioxide within said sealed envelope and in contact with the tops of said growing plant, thereby to provide a package for said growing plant that will maintain said growing plant in good condition for up to three weeks with periodic exposure to light.

21. The package set forth in claim 20, wherein said envelope is formed of a heat-shrinkable plastic that is shrunk around said plug to retain said plug in a predetermined position within said envelope.

22. The package set forth in claim 20, wherein said envelope has a reusable closure thereon.

23. The package set forth in claim 20, wherein said envelope has thinned areas in opposed portions thereof for receiving a display hook therethrough, whereupon the interior of said envelope is in communication with the surrounding atmosphere.

24. The package set forth in claim 20, wherein said envelope has a ventilating opening therein adjacent to said soil plug, and a removable strip covering said opening.

25. The package set forth in claim 20, wherein said atmosphere has a carbon dioxide content in the range from about 0.3% to about 1.0% by volume, an oxygen content in the range of about 5% to about 20% by volume, and the balance nitrogen.

26. The package set forth in claim 20, wherein the pressure of the atmosphere within said filled envelope is slightly in excess of standard atmospheric pressure at sea level.

27. A method of forming a polymerized soil plug with a growing plant molded therein comprising the steps of providing a mold open at the upper end and closed at the lower end thereof, applying a resin release agent to the inner surfaces of said mold, providing a quantity of particles of soil mix and a quantity of foam-forming synthetic organic plastic resin, forming an aqueous slurry of said soil mix and said synthetic organic plastic resin, placing a quantity of said slurry in said mold, placing the roots of a growing plant in said slurry in said mold, supporting said growing plant with the stalk extending from the upper surface of said slurry while said synthetic organic plastic resin reacts in situ to form a spongy open-celled hydrophilic polymer binding said quantity of particles of soil mix therein and into a plug and binding said roots in said plug, and removing said plug from said mold to providing a unitary self-supporting polymerized soil plug with a growing plant having its roots molded therein and its stalk molded therein and extending from one surface thereof.

28. The method set forth in claim 27, wherein said quantity of particles of soil mix comprises from about 20% to about 80% by dry weight of said soil plug.

29. The method set forth in claim 27, wherein said synthetic organic plastic resin is a polyurethane resin.

30. The method set forth in claim 27, wherein said synthetic organic plastic resin is a reaction product of toluene diisocyanate with a polyester having unreacted hydroxyl groups thereon and water.

31. The method set forth in claim 27, wherein said quantity of particles of soil mix and said quantity of organic plastic resin are mixed together in a water-acetone mixture.

32. The method set forth in claim 27, and further comprising the step of distributing the roots of the growing plant in said slurry.

33. The method set forth in claim 27, and further comprising the step of supporting said growing plant with the stalk extending through the associated surface of said slurry as said synthetic organic plastic resin reacts in situ to form the spongy open-celled hydrophilic polymer.

34. The method set forth in claim 27, wherein the slurry of soil mix and the synthetic organic plastic resin is initially in the temperature range from about 5° C. to about 20° C.

35. The method set forth in claim 27, wherein said release agent is lecithin.

36. The method set forth in claim 27, wherein the ratio in said slurry between the water therein and said quantity of synthetic organic resin is from about 1 to about 8 by weight.

37. A hanger for growing plants, said hanger comprising a quantity of particles of soil mix bound in a body of spongy open-celled hydrophilic polymer of synthetic organic plastic resin, said soil mix comprising from about 20% to about 80% by dry weight of the total dry weight of said resin and said soil mix, an attachment member affixed to said body and extending outwardly therefrom to effect mounting of said body, a plurality of openings in the sides of said body for receiving growing plants therein and extending therefrom, the upper end of said body having a well for water therein with at least the lower surface thereof in contact with said body to supply water through said body to the plants in said openings, and a catch basin disposed beneath and affixed to said body for catching and holding water dripping therefrom.

38. The hanger set forth in claim 37, wherein said body of soil mix is spherical in shape, and said openings are arranged with the longitudinal axes thereof extending radially in said body.

39. The hanger set forth in claim 38, wherein said catch basin is part spherical in shape having the same center of curvature as said body and being hollow.

40. The hanger set forth in claim 37, wherein said body of spongy polymer is cylindrical in form with said attachment member extending from one end thereof, and said openings have the longitudinal axes thereof disposed substantially normal to the longitudinal axis of said body.

41. The hanger set forth in claim 40, wherein said catch basin is disposed at the other end of said body and includes a bottom wall extending beyond the periphery of said body and having an upstanding wall surrounding said bottom wall and disposed outwardly with respect to the sides of said body.

42. The hanger set forth in claim 37, wherein said body of spongy polymer is conical in form, and the longitudinal axes of said openings are disposed substantially normal to the conical surface of said body.

43. The hanger set forth in claim 37, wherein said attachment member has a support member secured thereto and engaging said body for interconnecting said body and said attachment member.

44. The hanger set forth in claim 37, wherein the vertical walls of said well are impervious to water.

45. The hanger set forth in claim 37, wherein said body has a decorative coating on the outer surface thereof and around said openings.

46. A hanger with growing plants thereof comprising a quantity of particles soil mix bound in a body of spongy open-celled hydrophilic polymer of a synthetic organic plastic resin, an attachment member affixed to said body and extending outwardly therefrom to effect mounting of said body, the upper end of said body having a well for water therein with at least the lower surface thereof in contact with said body, a plurality of openings in the sides of said body in communication with said well for receiving water therefrom, a plurality of porous plugs respectively disposed in said openings and each having a growing plant therein receiving water from said well through said body and the associated plug, said plug including a quantity of foam-forming synthetic organic plastic resin reacted in situ with particles of soil mix distributed therethrough and comprising from about 20% to about 80% by dry weight of said plug, and a catch basin disposed beneath and affixed to said body for catching and holding water dripping therefrom.

47. The hanger set forth in claim 46, wherein said plugs comprise a quantity of particles of soil mix bound in a body of spongy open-celled hydrophilic polymer of a synthetic organic plastic resin.

48. The hanger set forth in claim 46, wherein said body of spongy polymer is spherical in shape, and said openings are arranged with the longitudinal axes thereof extending radially in said body.

49. The hanger set forth in claim 46, wherein said body of spongy polymer is cylindrical in form with said attachment member extending from one end thereof, and said openings have the longitudinal axes thereof disposed substantially normal to the longitudinal axis of said body.

50. The hanger set forth in claim 46, wherein said body of spongy polymer is conical in form, and the longitudinal axes of said openings are disposed substantially normal to the conical surface of said body.

51. A plaque for growing plants, said plaque comprising a container having a base and a side wall surrounding said base, a body of spongy open-celled hydrophilic polymer having a quantity of particles of soil mix disposed in said container and bound into a cohesive mass and to said container by said open-celled hydrophilic polymer, said soil mix comprising from about 20% to about 80% by dry weight of said body, and a plurality of openings in the surface of said body for removably receiving porous plugs having growing plants therein and extending therefrom, whereby the plugs having growing plants therein may be replaced and rearranged to provide fresh and various designs of growing plants on said plaque.

52. The plaque set forth in claim 51, wherein said container has a hanger on the rear of said base for hanging said container on a vertical support.

53. The plaque set forth in claim 51, wherein said openings are cylindrical in form with the longitudinal axes disposed substantially normal to said base, and the plugs are cylindrical in form and shaped complimentary to said openings.

54. A polymerized soil mass comprising a body of spongy open-celled hydrophilic polymer, a quantity of particles of soil mix distributed throughout said body of spongy polymer, a quantity of foam-forming synthetic organic plastic resin being reacted in situ to form said body of spongy open-celled hydrophilic polymer binding said particles of soil mix therein and into a cohesive soil mass, said resin comprising from about 20% to about 80% by dry weight of said soil mass, thereby to provide a unitary self-supporting polymerized soil mass.

55. The polymerized soil mass set forth in claim 54, wherein said soil mass has an apparent density on a dry basis of from about 0.18 gm. per cc. to about 0.3 gm. per cc.

56. The polymerized soil mass set forth in claim 54, wherein said soil mass in the dry condition can take up about three times its weight of water.

57. The polymerized soil mass set forth in claim 55, wherein said synthetic organic plastic resin is a polyurethane resin.

58. The polymerized soil mass set forth in claim 54 wherein said synthetic organic plastic resin is a reaction product of toluene diisocyanate with a polyester having unreacted hydroxyl groups thereon and water.

59. The polymerized soil mass set forth in claim 54, wherein said soil mix is a mineral soil.

60. The polymerized soil mass set forth in claim 54, wherein said soil mix is a mixture of a natural organic soil and an agricultural modified mineral selected from the group consisting of Perlite and Vermiculite.

61. The polymerized soil mass set forth in claim 54, wherein said soil mix is a synthetic organic soil substitute.

62. The polymerized soil mass set forth in claim 54, wherein said soil mix is a mixture of a natural organic soil, an agricultural modified mineral selected from the group consisting of Perlite and Vermiculite, and sewage sludge.

63. A package of polymerized soil plug with a growing plant therein, said package comprising a flexible transparent envelope, a polymerized soil plug having a substantial water holding capacity and disposed within said envelope, said soil plug including a body of spongy open-celled hydrophilic polymer and a quantity of particles of soil mix distributed throughout said body of spongy polymer, and a growing plant having the roots thereof in said polymerized soil plug and having the stalk thereof extending outwardly from one surface of said polymerized soil plug, a quantity of foam-forming synthetic organic plastic resin being reacted in situ to form said body of spongy open-celled hydrophilic polymer binding said particles of soil mix therein and into a plug and binding said roots in said plug, said soil mix comprising from about 20% to about 80% by dry weight of said plug, said roots being distributed substantially uniformly throughout the adjacent portions of said plug and said stalk being intimately surrounded by said plug, said polymerized soil plug being essentially saturated with water providing moisture for said growing plant, said envelope having openings therein adjacent to the foliage on said plant so that the interior of said envelope is in communication with the surrounding atmosphere, thereby to provide a package for said growing plant that will maintain said growing plant in good condition for up to three weeks with periodic exposure to light.

* * * * *

UNITED STATES PATENT AND TRADEMARK OFFICE
CERTIFICATE OF CORRECTION

PATENT NO. : 4,034,508
DATED : July 12, 1977
INVENTOR(S) : Richard R. Dedolph

It is certified that error appears in the above-identified patent and that said Letters Patent are hereby corrected as shown below:

Column 1, line 59, after "a" insert --polymerized--.
Column 4, line 50, "110" should be --100--.
Column 8, line 4, "Teh" should be --The--.
Column 10, line 12, after "grown" insert --from seed--;
　　　　　　line 15, "bromeliods" should be --bromeliads--;
　　　　　　line 45, "slits" should be --silts--.
Column 13, line 21, "attache" should be --attach- --;

line 28, "partispherical" should be --partspherical--;
　　　　　　line 46, "It" should be --If--.
Column 14, line 59, "axes" should be --axis--.
Column 15, line 31, "hydrophlic" should be --hydrophilic--.
Column 19, line 58, after "particles" insert --of--.
Column 21, line 1, "55" should be --54--.

Signed and Sealed this

Eleventh Day of October 1977

[SEAL]

Attest:

RUTH C. MASON
Attesting Officer

LUTRELLE F. PARKER
Acting Commissioner of Patents and Trademarks